(12) United States Patent
Corbett et al.

(10) Patent No.: US 8,909,885 B2
(45) Date of Patent: *Dec. 9, 2014

(54) FILE SYSTEM CAPABLE OF GENERATING SNAPSHOTS AND PROVIDING FAST SEQUENTIAL READ ACCESS

(71) Applicant: NetApp, Inc., Sunnyvale, CA (US)

(72) Inventors: Peter F. Corbett, Sunnyvale, CA (US); Michael Kazar, Sunnyvale, CA (US)

(73) Assignee: NetApp, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/964,550

(22) Filed: Aug. 12, 2013

(65) Prior Publication Data

US 2013/0332688 A1 Dec. 12, 2013

Related U.S. Application Data

(63) Continuation of application No. 11/693,057, filed on Mar. 29, 2007, now Pat. No. 8,510,524.

(51) Int. Cl.
*G06F 12/00* (2006.01)
*G06F 17/30* (2006.01)
*G06F 13/00* (2006.01)
*G06F 13/28* (2006.01)

(52) U.S. Cl.
CPC .......... *G06F 17/30088* (2013.01); *G06F 13/28* (2013.01); *G06F 13/00* (2013.01); *G06F 12/00* (2013.01)
USPC ............ 711/162; 711/112; 711/153; 707/639

(58) Field of Classification Search
CPC ......... G06F 13/28; G06F 13/00; G06F 12/00; G06F 17/30088
USPC ............................ 711/112, 153, 162; 707/639
See application file for complete search history.

(56) References Cited

U.S. PATENT DOCUMENTS

| 4,570,217 | A | 2/1986 | Allen et al. |
| 5,124,987 | A | 6/1992 | Milligan et al. |
| 5,163,131 | A | 11/1992 | Row et al. |
| 5,202,979 | A | 4/1993 | Hillis et al. |
| 5,278,979 | A | 1/1994 | Foster et al. |

(Continued)

OTHER PUBLICATIONS

Akyurek, Sedat, Placing Replicated Data to Reduce Seek Delays, Department of Computer Science, University of Maryland, UMIACS-TR-91-121, CS-TR-2746, Aug. 1991.

(Continued)

*Primary Examiner* — Yong Choe
*Assistant Examiner* — Mark Giardino, Jr.
(74) *Attorney, Agent, or Firm* — Cesari and McKenna, LLP

(57) ABSTRACT

An on-disk structure of a file system has the capability to generate snapshots and provide fast sequential read access to data containers, such as files. The on-disk structure arranges sequential portions of files on disk within regions, wherein each region comprises a predetermined amount of disk space represented by blocks and wherein the data of the files stored within each region may or may not be stored sequentially within the region. In addition, the on-disk structure accommodates a plurality of types of regions, including (i) active regions that contain active file system data for large files, (ii) snapshot regions that contain "copy out" snapshot data for the large files and (iii) metadata regions that contain metadata, as well as directories and small files.

14 Claims, 7 Drawing Sheets

(56) References Cited

U.S. PATENT DOCUMENTS

| | | | |
|---|---|---|---|
| 5,403,667 | A | 4/1995 | Simoens |
| 5,530,855 | A | 6/1996 | Satoh et al. |
| 5,581,724 | A | 12/1996 | Belsan et al. |
| 5,819,292 | A | 10/1998 | Hitz et al. |
| 6,061,770 | A | 5/2000 | Franklin |
| 6,081,875 | A | 6/2000 | Clifton et al. |
| 6,085,290 | A * | 7/2000 | Smith et al. ............. 711/131 |
| 6,085,298 | A * | 7/2000 | Ohran ....................... 711/162 |
| 6,341,341 | B1 | 1/2002 | Grummon et al. |
| 6,654,772 | B1 | 11/2003 | Crow et al. |
| 7,054,893 | B2 | 5/2006 | Mogi et al. |
| 7,127,577 | B2 | 10/2006 | Koning et al. |
| 7,409,494 | B2 | 8/2008 | Edwards et al. |
| 7,454,445 | B2 | 11/2008 | Lewis et al. |
| 7,526,623 | B1 * | 4/2009 | Rao ........................... 711/162 |
| 2003/0159007 | A1 | 8/2003 | Sawdon et al. |
| 2005/0027748 | A1 | 2/2005 | Kisley |
| 2005/0066095 | A1 | 3/2005 | Mullick et al. |
| 2005/0138312 | A1 | 6/2005 | Kubo et al. |
| 2005/0216535 | A1 | 9/2005 | Saika et al. |
| 2007/0260830 | A1 | 11/2007 | Faibish et al. |

OTHER PUBLICATIONS

Bitton, Dina, Disk Shadowing, Proceedings of the 14th VLDB Conference, LA, CA 1988.

Chaudhuri, Surajit, et al., Self-Tuning Technology in Microsoft SQL Server, Data Engineering Journal 22, 2 1999 pp. 20-27.

Chutani, Sailesh, et al., The Episode File System, In Proceedings of the USENIX Winter 1992.

Coyne, Robert A., et al., Storage Systems for National Information Assets, Proc. Supercomputing 92, Minneapolis, Nov. 1992, pp. 626-633.

Final Office Action, U.S. Appl. No. 11/693,061, Mail Date Dec. 29, 2009, 23 pages.

Final Office Action, U.S. Appl. No. 11/693,061, Mail Date May 3, 2012, 19 pages.

Finlayson, Ross S., et al., Log Files: An Extended File Service Exploiting Write-Once Storage Department of Computer Science, Stanford University, Report No. STAN-CS-87-1177, Sep. 1987.

Gray, Jim, et al., The Recovery Manager of the System R Database Manager, ACM Computing Surveys, (13)2:223-242 1981.

Hecht, Matthew S., et al. Shadowed Management of Free Disk Pages with a Linked List, ACM Transactions on Database Systems, 8/4, Dec. 1983, pp. 503-514.

Howard, John, H. et al., Scale and Performance in a Distributed File System, Carnegie Mellon University, SMU-ITC-87-068, Aug. 1987.

Howard, John H., An Overview of the Andrew File System, Carnegie Mellon University, CMU-ITC-88-0602 1988.

Howard, John, H. et al., Scale and Performance in a Distributed File System, ACM Trans. Computer System, 6(1), Feb. 1988 pp. 51-81.

Kazar, Michael Leon, Synchronization and Caching Issues in the Andrew File System, Carnegie Mellon University, CMU-ITC-88-063.

Kazar, Michael L., et al., DEcorum File System Architectural Overview, USENIX Summer Conference, Anaheim, California, 1990.

Kemper, Alfons, et al., Performance Tuning for SAP R/3, Data Engineering Journal 22, 2 1999 pp. 33-40.

Kent, Jack et al., Optimizing Shadow Recovery Algorithms, IEEE Transactions on Software Engineering, 14(2): 155-168, Feb. 1988.

Kistler, et al., Disconnected Operation in the Coda File System, ACM Transactions on Computer Systems, vol. 10, No. 1, Feb. 1992, pp. 3-25.

Lorie, Raymond, A. Physical Integrity in a Large Segmented Database, ACM Trans. Database Syst., vol. 2, Mar. 1977, pp. 91-104.

Non-Final Office Action, U.S. Appl. No. 11/693,061, mail date Aug. 27, 2009, 16 pages.

Non-Final Office Action, U.S. Appl. No. 11/693,061, mail date Dec. 6, 2011, 25 pages.

Non-Final Office Action, U.S. Appl. No. 11/693,061, mail date Jan. 29, 2013, 20 pages.

Notice of Allowance, U.S. Appl. No. 11/693,061, mail date May 6, 2013, 7 pages.

Ousterhout, John et al., Beating the I/O Bottleneck: A Case for Log-Structured File Systems, Technical Report, Computer Science Division, Electrical Engineering and Computer Sciences, University of California at Berkeley, Oct. 30, 1988.

Patterson, D., et al., A Case for Redundant Arrays of Inexpensive Disks (RAID), Technical Report, CSD-87-391, Computer Science Division, Electrical Engineering and Computer Sciences, University of California at Berkeley 1987.

Patterson, D., et al., A Case for Redundant Arrays of Inexpensive Disks (RAID), SIGMOD International Conference on Management of Data, Chicago, IL, USA, Jun. 1-3, 1988, SIGMOD RECORD (17)3:109-16 Sep. 1988.

Peterson, Zachary Nathaniel Joseph, Data Placement for Copy-on-Write Using Virtual Contiguity, University of CA, Santa Cruz, Master's Thesis for the Department of Science in computer Science, Sep. 2002.

Quinlan, Sean, A Cached WORM File System, Software-Practice and Experience, 21(12):1289-1299 1991.

Rosenblum, Mendel, et al., The LFS Storage Manager, Computer Science Division, Electrical Engineering and Computer Sciences, Univ. of CA, presented at Summer '90 USENIX Technical Conference, Anaheim, CA Jun. 1990.

Rosenblum, Mendel, et al. The Design and Implementation of a Log-Structured File System Jul. 24, 1991 pp. 1-15.

Rosenblum, Mendel, The Design and Implementation of a Log-Structured File System, 1992 pp. 1-93.

Rosenblum, Mendel, et al., The Design and Implementation of a Log-Structured File System, In Proceedings of ACM Transactions on Computer Systems, (10)1:26-52, Feb. 1992.

Schiefer, Berni, et al., DB2 Universal Database Performance Tuning, Data Engineering Journal 22, 2 1999 pp. 12-19.

Seltzer, Margo I., et al., Journaling Versus Soft Updates: Asynchronous Meta-Data Protection in File Systems, Proceedings of 200 USENIX Annual Technical Conference, Jun. 18-23, 2000.

Shasha, Dennis, Tuning Time Series Queries in Finance: Case Studies and Recommendations, Data Engineering Journal 22, 2 1999 pp. 41-47.

Sidebotham, Bob, Volumes: The Andrew File System Data Structuring Primitive, EEUG Conference Proceedings, Manchester, UK, Autumn 1996.

Subramanian, Muralidhar, et al., Performance Challenges in Object-Relational DBMSs, Data Engineering Journal 22, 2 1999 pp. 28-32.

Weikum, Gerhard, et al., Towards Self-Tuning Memory Management for Data Servers, Data Engineering Journal 22, 2 1999 pp. 3-11.

West, Michael, et al. The ITC Distributed File System: Prototype and Experience, Carnegie-Mellon University, Technical Report CMU-ITC-040, Mar. 1985.

Zayas, Edward R., AFS-3 Programmer's Reference: Architectural Overview, Transarc Corporation, Pittsburgh, PA, 1.0 edition 1991.

Hitz, Dave et al., *File System Design for an NFS File Server Appliance*, Technical Report 3002, Rev. C395, presented Jan. 19, 1994.

Corbett et al. Maintaining Snapshot and Active File System Metadata in an On-Disk Structure of a File System, U.S. Appl. No. 11/693,061, filed Mar. 29, 2007, 37 pages.

\* cited by examiner

FILE SYSTEM CAPABLE OF GENERATING SNAPSHOTS AND PROVIDING FAST SEQUENTIAL READ ACCESS

CROSS-REFERENCE TO RELATED APPLICATION

The present application is a continuation of U.S. patent application Ser. No. 11/693,057 which was filed on Mar. 29, 2007 by Peter F. Corbett, et al. for a FILE SYSTEM CAPABLE OF GENERATING SNAPSHOTS AND PROVIDING FAST SEQUENTIAL READ ACCESS which is related to the U.S. patent application Ser. No. 11/693,061 which was filed on Mar. 29, 2007 by Peter F. Corbett et al. for a MAINTAINING SNAPSHOT AND ACTIVE FILE SYSTEM METADATA IN AN ON-DISK STRUCTURE OF A FILE SYSTEM.

FIELD OF THE INVENTION

The present invention relates to file systems and, more specifically, to an on-disk structure of a file system.

BACKGROUND OF THE INVENTION

A storage system is a computer that provides storage service relating to the organization of information on writable persistent storage devices, such as memories, tapes or disks. The storage system is commonly deployed within a storage area network (SAN) or a network attached storage (NAS) environment. When used within a NAS environment, the storage system may be embodied as a file server including an operating system that implements a file system to logically organize the information as a hierarchical structure of data containers, such as directories and files on, e.g., the disks. When used within a SAN environment, the storage system may organize the information in the form of databases or files. Where the information is organized as files, the client requesting the information typically maintains file mappings and manages file semantics, while its requests (and system responses) address the information in terms of block addressing on disk using, e.g., a logical unit number.

Each "on-disk" file may be implemented as set of data structures, i.e., disk blocks, configured to store information, such as the actual data for the file. These data blocks are typically organized within a volume block number (vbn) space that is maintained by the file system. The file system may also assign each data block in the file a corresponding "file offset" or file block number (fbn) position in the file. The file system typically assigns sequences of fbns on a per-file basis, whereas vbns are assigned over a larger volume address space. That is, the file system organizes the data blocks within the vbn space as a volume; each volume may be, although is not necessarily, associated with its own file system. The file system typically consists of a contiguous range of vbns from zero to n, for a file system of size n−1 blocks.

The storage system may be further configured to operate according to a client/server model of information delivery to thereby allow many clients to access files stored on the system. In this model, the client may comprise an application, such as a database application, executing on a computer that "connects" to the storage system over a computer network, such as a point-to-point link, shared local area network, wide area network or virtual private network implemented over a public network, such as the Internet. The client typically communicates with the storage system by exchanging discrete frames or packets of data according to pre-defined protocols, such as the Transmission Control Protocol/Internet Protocol (TCP/IP). In addition, the client may request the services of the system by issuing file system protocol messages over the network to the storage system.

A file system may have the capability to generate a snapshot of its active file system. An "active file system" is a file system to which data can be both written and read, or, more generally, an active store that responds to both read and write operations. The snapshot is another form of a data container that refers to a copy of file system data that diverges from the active file system over time as the active file system is modified. Snapshots are well-known and described in U.S. patent application Ser. No. 09/932,578 entitled Instant Snapshot by Blake Lewis et al., now issued as U.S. Pat. No. 7,494,445 on Nov. 11, 2008, TR3002 File System Design for a NFS File Server Appliance by David Hitz et al., published by Network Appliance, Inc. and in U.S. Pat. No. 5,819,292 entitled Method for Maintaining Consistent States of a File System and For Creating User-Accessible Read-Only Copies of a File System, by David Hitz et al., each of which is hereby incorporated by reference as though fully set forth herein.

A common type of file system is a "write in-place" file system, where the locations of the data structures on disk are typically fixed. That is, the disk is "viewed" as a large sequential array of blocks and changes (updates) to the data of a file stored in the blocks are made in-place, i.e., data is overwritten at the same disk locations. The write in-place file system may assume a layout such that the data is substantially contiguously arranged on disks. This disk layout results in efficient access operations, particularly for sequential read operations, directed to the disks. Updating of data in-place thus maintains efficient read access to the data, but often at the expense of write performance.

Another type of file system is a journal or log-structured file system that generally does not overwrite data on disks. If a data block on disk is retrieved (read) from disk into memory of the storage system and "dirtied" or changed (updated) with new data provided by, e.g., an application, the data block is stored (written) to a new location on disk to optimize write performance. Updates to the data of a file may thus result in random, relocation of the blocks on disks. Over time and after many updates, the blocks of the file may become randomly scattered over the disks such that the file can become fragmented. This, in turn, causes sequential access operations, such as sequential read operations, of the file to randomly access the disks. Random access operations to a fragmented file are generally much slower than sequential access operations, thereby adversely impacting the overall performance of those operations.

The on-disk format representation of the log-structured file system may be block-based using fixed-sized file system blocks. As a result, fragmentation may be fine-grained relative to disk drive and application performance. For example, the size of the blocks used by an application executing on a client may be larger than the fixed-sized blocks of the file system and, thus, must be fragmented internally on the file system. These fragmented blocks may thereafter be stored over various portions of disks such that, over time, sequential read performance is adversely impacted. The adverse performance caused by fragmentation typically manifests in block-type workloads, such as Small Computer Systems Interface (SCSI), Fibre Channel (FC), iSCSI, database over Network File System (NFS), and other enterprise applications involving SAN offerings. In such offerings, the application expects to access large, contiguous regions of disk space such that, when the client writes data into those regions, the data (i.e., the active data) remains contiguous.

Often, the fragmentation resulting from operation of the log-structured file system is exasperated by the large amount of metadata that is represented in the file system. As used herein, the term metadata denotes information used to describe, e.g., data containers, such as files, and, thus, may include indirect blocks. For example, a typical database workload involves many write operations to a large file that appear random from a file system perspective. Depending upon the frequency at which updates are "flushed" to disk, only a few data blocks may be written to the file during an update interval and those blocks are typically scattered. However, the file system may need to write (modify) indirect blocks associated with those data blocks. At least one indirect block is typically written for every modified data block, thereby causing potentially substantial metadata processing, i.e., change.

SUMMARY OF THE INVENTION

The present invention overcomes the disadvantages of the prior art by providing an on-disk structure of a file system that has the capability to generate snapshots and that provides fast sequential read access to data containers, such as files and snapshots, stored on a storage system. The on-disk structure arranges sequential portions of files on disk within regions, wherein each region comprises a predetermined amount of disk space represented by blocks and wherein the data of the file stored within each region may or may not be stored sequentially within the region. In addition, the on-disk structure accommodates a plurality of types of regions, including (i) active regions that contain active file system data for large files, (ii) snapshot regions that contain "copy out" snapshot data for the large files and (iii) metadata regions that contain metadata, as well as directories and small files.

In an illustrative embodiment, the file system allocates an active region in response to an event, such as a request to create or extend a large file in which to store data associated with the file. According to the inventive on-disk structure, a first portion of the active region is used to store active file system data for the file (i.e., active data). The first portion of the active region may be the contiguous first portion of the region, or may be assembled from disjoint portions of the region. Initially, the file system allocates an empty, active region for the file and stores (writes) active data in allocated blocks of the first portion of the region. As the active data in the region ages, some of the data may only be stored in snapshots, as active data of the file is overwritten. New active data is written to blocks of the region that are still empty, leaving the old snapshot data in current block locations. Hence, the active data blocks of the file may gradually spread throughout the region and be interspersed with data blocks that still must be stored, but that are only stored in snapshots, i.e., in a second portion of the active region.

A snapshot of the file may be generated at any time. Subsequent to generating a snapshot, if any active blocks are overwritten within the active region and if one or more of those blocks is also required by a snapshot (i.e., it has yet to be overwritten since the most recent snapshot was generated), the block is preserved as is in its current vbn position of the region. The new version of the block is written to any free block space within the active region. If there is no such space, a copy-out operation is performed to create empty space by removing all snapshot blocks in the region belonging only to snapshots and that no longer belong to the active file system.

One or more new active regions may be allocated to the file as the file is extended. However, as the amount of snapshot data associated with the file grows, one or more snapshot regions may be allocated to the file to store the snapshot data, which is "copied out" from the active regions. To that end, the file system invokes a copy-out process that gathers all blocks of the active region that are marked "snap", including the blocks that are about to be overwritten, and writes the data of those blocks to the snapshot region. As a result, the file may have a plurality of allocated regions, including active regions that contain active data and snapshot regions that contain snapshot data.

BRIEF DESCRIPTION OF THE DRAWINGS

The above and further advantages of the invention may be better understood by referring to the following description in conjunction with the accompanying drawings in which like reference numerals indicate identical or functionally similar elements.

DETAILED DESCRIPTION OF ILLUSTRATIVE EMBODIMENTS

Figure 1:
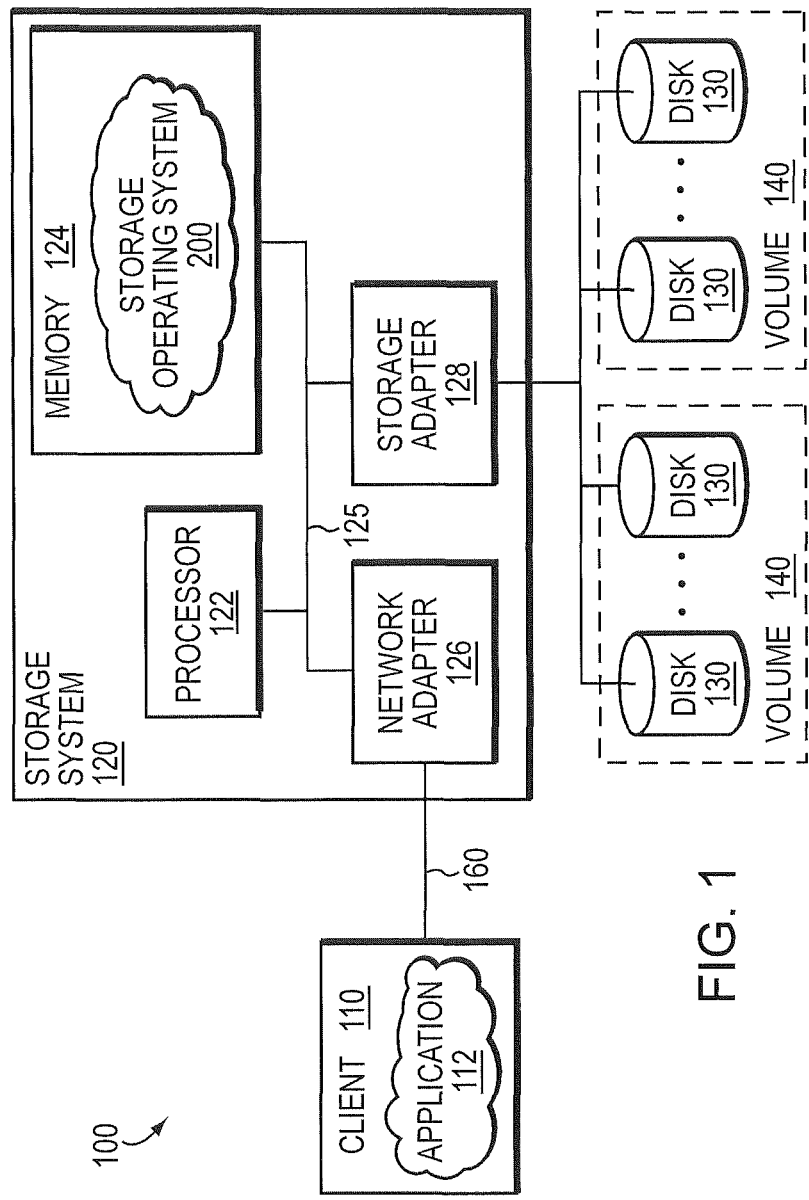
FIG. 1 is a schematic block diagram of an environment including a storage system that may be advantageously used with the present invention.

FIG. 1 is a schematic block diagram of an environment 100 including a storage system configured to provide storage services relating to the organization of information on writable persistent storage devices, such as disks 130. The storage system 120 is illustratively embodied as a computer comprising a processor 122, a memory 124, a network adapter 126 and a storage adapter 128 interconnected by a system bus 125. The storage system serves both file and block protocol access to information stored on the storage devices for users (system administrators) and clients of network attached storage (NAS) and storage area network (SAN) deployments. The storage system 120 provides NAS services through a file system and SAN services through SAN virtualization, including logical unit number (lun) emulation.

The memory 124 comprises storage locations that are addressable by the processor 122 and adapters 126, 128 for storing software programs and data structures associated with the embodiments described herein. The processor and adapters may, in turn, comprise processing elements and/or logic circuitry configured to execute the software programs and manipulate the data structures. A storage operating system 200, portions of which is typically resident in memory and executed by the processing elements, functionally organizes the storage system by, inter alia, invoking storage operations in support of software processes executing on the system. It will be apparent to those skilled in the art that other processing and memory means, including various computer readable media, may be used to store and execute program instructions pertaining to the inventive technique described herein.

The network adapter 126 comprises the mechanical, electrical and signaling circuitry needed to connect the storage system 120 to a client 110 over a computer network 160, which may comprise a point-to-point connection or a shared medium, such as a local area network. The client 110 may be a general-purpose computer configured to execute applications 112, such as a database application. Moreover, the client 110 may interact with the storage system 120 in accordance with a client/server model of information delivery. To that end, the client may utilize file-based access protocols when accessing information (in the form of files) over a NAS-based network. In addition, the client 110 may utilize block-based access protocols, such as the Small Computer Systems Interface (SCSI) protocol, when accessing information (in the form of blocks, disks or luns) over a SAN-based network.

The storage adapter 128 cooperates with the storage operating system 200 executing on the storage system to access information requested by the client. The information may be stored on the disks 130 or other similar media adapted to store information. The storage adapter includes input/output (I/O) interface circuitry that couples to the disks over an I/O interconnect arrangement, such as a conventional high-performance, Fibre Channel (FC) serial link topology. The information is retrieved by the storage adapter and, if necessary, processed by the processor 122 (or the adapter 128) prior to being forwarded over the system bus 125 to the network adapter 126, where the information is formatted into one or more packets and returned to the client 110.

Storage of information on the storage system 120 is preferably implemented as one or more storage volumes 140 that comprise one or more disks 130 cooperating to define an overall logical arrangement of volume block number (vbn) space on the volume(s). Each volume 140 is generally, although not necessarily, associated with its own file system. The disks within a volume/file system are typically organized as one or more groups, wherein each group may be operated as a Redundant Array of Independent (or Inexpensive) Disks (RAID). The volumes may be embodied as flexible (virtual) volumes and further organized as an aggregate. Aggregates and virtual volumes are described in U.S. patent application Ser. No. 10/836,817 titled Extension of Write Anywhere File System Layout, by John K. Edwards et al., now issued as U.S. Pat. No. 7,409,494 on Aug. 5, 2008 and assigned to Network Appliance, Inc., which is hereby incorporated by reference as though fully set forth herein.

To facilitate access to the disks 130, the storage operating system 200 implements a file system that logically organizes the information as a hierarchical structure of data containers, such volumes, files and luns, on the disks 130, to thereby provide an integrated NAS and SAN approach to storage by enabling file-based (NAS) access to the volumes and files, while further enabling block-based (SAN) access to the luns on a file-based storage platform. In an illustrative embodiment described herein, the storage operating system is the FreeBSD operating system kernel available from Network Appliance, Inc., Sunnyvale, Calif. that implements a Move Anywhere Proximate Layout (MAPL™) file system. However, it is expressly contemplated that any appropriate file system can be used, and as such, where the term "MAPL" is employed, it should be taken broadly to refer to any file system that is otherwise adaptable to the teachings of this invention.

As used herein, the term "storage operating system" generally refers to the computer-executable code operable on a computer to perform a storage function that manages data access and may, in the case of a storage system 120, implement data access semantics of a general purpose operating system. The storage operating system can also be implemented as a microkernel, an application program operating over a general-purpose operating system, such as UNIX® or Windows NT®, or as a general-purpose operating system with configurable functionality, which is configured for storage applications as described herein.

In addition, it will be understood to those skilled in the art that the invention described herein may apply to any type of special-purpose (e.g., file server, filer or storage serving appliance) or general-purpose computer, including a standalone computer or portion thereof, embodied as or including a storage system. Moreover, the teachings of this invention can be adapted to a variety of storage system architectures including, but not limited to, a network-attached storage environment, a storage area network, a disk assembly directly-attached to a client or host computer and a distributed architecture of network and disk element nodes organized as a storage system cluster. The term "storage system" should therefore be taken broadly to include such arrangements in addition to any subsystems configured to perform a storage function and associated with other equipment or systems.

Figure 2:
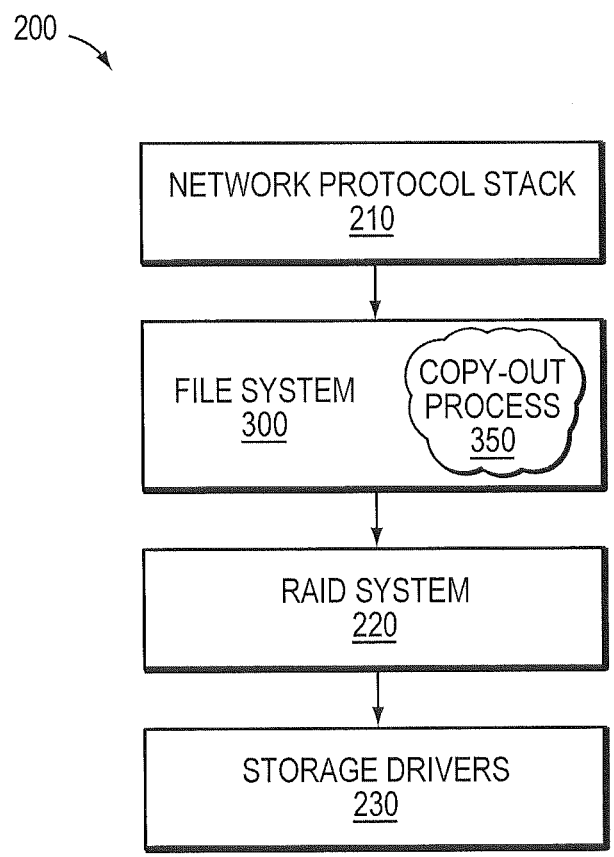
FIG. 2 is a schematic block diagram of a storage operating system that may be advantageously used with the present invention.

FIG. 2 is a schematic block diagram of the storage operating system 200 that may be advantageously used with the present invention. The storage operating system comprises a series of software layers organized to form an integrated network protocol stack 210 that provides data paths for clients to access information stored on the storage system using block and file access protocols. The network protocol stack 210 illustratively includes a network driver layer (e.g., an Ethernet driver and a FC driver), a network protocol layer (e.g., an Internet Protocol layer and its supporting transport mechanisms, the Transport Control Protocol layer and the User Datagram Protocol layer), and a file/block protocol server layer (e.g., a Common Internet File System server, a Network File System server, an iSCSI server, etc.). In addition, the storage operating system includes a RAID system layer 220 that implements a disk storage protocol, such as a RAID protocol, and a storage driver layer 230 that implements a disk access protocol such as, e.g., a SCSI protocol.

Disposed between the network protocol stack 210 and RAID system 220 is a file system layer 300 that implements a file system, such as the MAPL file system. The file system 300 is illustratively a journalled file system that is targeted to large file workloads and that has the capability to generate snapshots without the need to perform an expensive copy-on-write operation for every write operation directed to file system data, i.e., the file system is configured to perform such operations reasonably efficiently. The file system 300 has an on-disk format representation that is block-based using index nodes ("inodes") to identify files and file attributes (such as creation time, access permissions, size and block location). The file system also illustratively uses data structures to store metadata describing the layout of its file system; these metadata structures include, among others, an inode table.

The present invention is directed to the on-disk structure of the file system that provides fast sequential read access to data containers, such as files and snapshots. The on-disk structure arranges sequential portions of files on disk within regions, wherein each region comprises a predetermined amount of disk space represented by blocks, e.g., disk blocks, and wherein the data of the files stored within each region may or may not be stored sequentially within the region. A space allocation map identifies those regions that are allocated and those regions that are available (free) for allocation. The space allocation map is illustratively embodied as a bit map and is organized on a region (e.g., 1 MB or larger) granularity, e.g., the allocation map includes one bit per region. Accordingly, the file system allocates entire regions of disk space, wherein the regions can be designated for different purposes/roles. Illustratively, the designated role of a region can be discerned through examination of certain inode metadata (or alternatively via an identifier that indicates its role).

Figure 3:
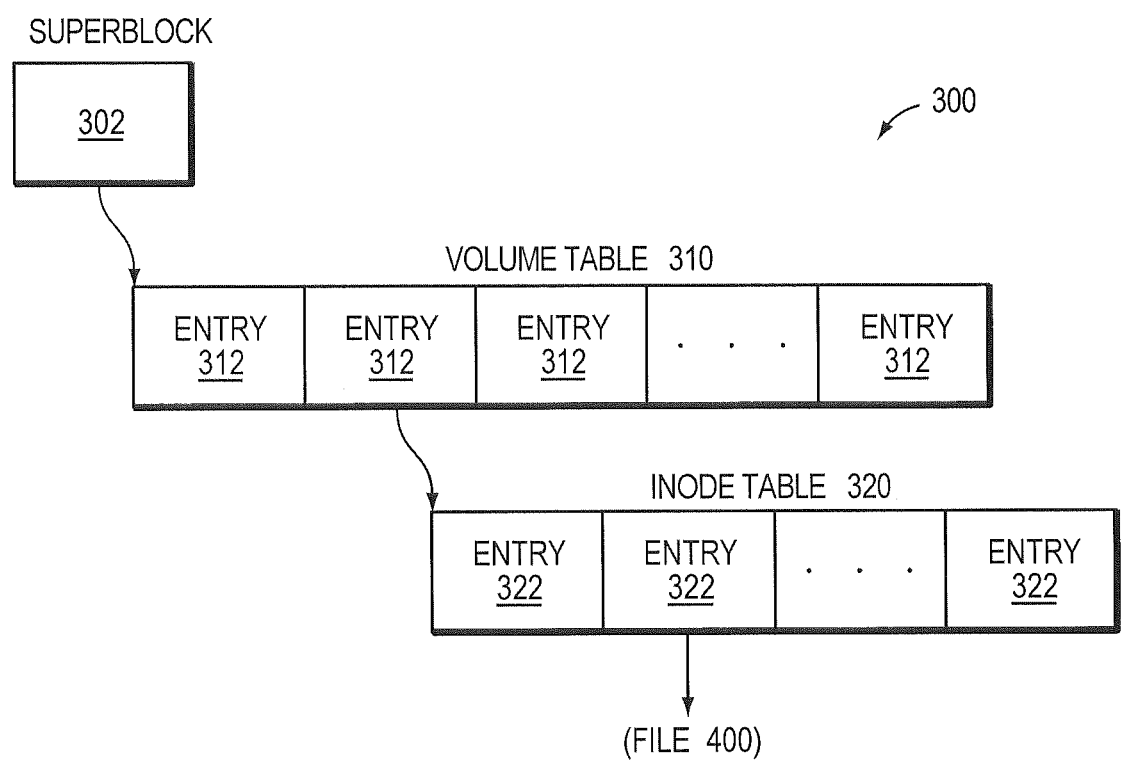
FIG. 3 is a schematic block diagram illustrating an on-disk structure of a file system that may be advantageously used in accordance with the present invention.

FIG. 3 is a schematic block diagram illustrating the on-disk structure of the file system 300 that may be advantageously used in accordance with the present invention. The file system structure includes a super block 302, one or more volume tables 310 and one or more inode tables 320. The super block 302 is a root block representing the root of an aggregate; the super block is stored at predefined locations on disk and comprises various system wide configuration data. The volume table 310 is a data structure having a plurality of entries 312. Illustratively, there is one entry 312 for every volume in the aggregate, e.g., there is one entry for every snapshot of every volume, as well an entry for the active file system/volume. Each volume table entry 312 includes an inode of a data structure, e.g., inode table 320, which includes all other inodes of the volume.

In an illustrative embodiment, snapshots are generated at the volume level (i.e., on a per volume basis). It should be noted that the term "snapshot" is used for purposes of this patent to designate a persistent consistency point image. A persistent consistency point image (PCPI) is a space conservative, point-in-time read-only image of data accessible by name that provides a consistent image of that data (such as a storage system) at some previous time. More particularly, a PCPI is a point-in-time representation of a storage element, such as an active file system, file or database, stored on a storage device (e.g., on disk) or other persistent memory and having a name or other identifier that distinguishes it from other PCPIs taken at other points in time. A PCPI may comprise an active file system image that contains complete information about the file system, including all metadata. A PCPI can also include other information (metadata) about the active file system at the particular point in time for which the image is taken.

A multi-bit (e.g., 32-bit) monotonically increasing, snapshot identifier ("snapid") is provided that represents a snapshot and that increases every time a snapshot is generated for a volume. The eventual wrap-around of this multi-bit number can be handled by a technique of ensuring that all snapshots older than a prescribed value have been deleted, allowing new snapshots to be created in the same number range. The file system issues and allocates snapids sequentially per volume, thereby enabling the file system to accommodate a substantially large number of snapshots per volume. In addition, the snapid facilitates organization of snapshot metadata within, e.g., an indirect block or other data structure used to organize metadata associated with snapshot data, as described further herein. The snapid is also used to determine which blocks belong to which snapshots. To that end, every block that is used in a snapshot has an associated "valid-to" snapid field denoting the newest snapshot for which the block is valid. The oldest snapshot for which the block is valid is one greater than the valid-to field of the next older block at the same file block number (fbn). If there is no next older block at the same fbn, the block is valid for all older snapshots. Thus, for example, if fbn 110 has a block that is valid to snapshot (snapid) 10 and another that is valid-to snapid 20, then all snapshots from snapids 11 to 20 include the block that is valid-to snapid 20.

Note that a block can reside in multiple snapshots; however the file system stores only one number (ID) for each block.

When generating a snapshot of a volume, the file system allocates a new volume table entry 312 for that snapshot. Assume the snapid is 17 when a snapshot is generated. The volume's snapid field is incremented to 18, and a new entry for the snapshot having a snapid 18 is allocated in the volume table 310 that points to the inode table 320 for that volume; accordingly, the snapshot (and allocated volume table entry) initially shares the inode table with the active file system. Thereafter, modifications are made to the active file system data within an active region of a file in the volume, as described below. As a result, the inode table 320 of the snapshot (snapid 17) starts to diverge from that of the active file system and, thus, the snapshot forms its own inode table. However, the snapshot data remains intact in that region until a copy-out operation is performed to a snapshot region allocated to the file. Accordingly, each volume table entry 312 directly references (points to) the inode table 320 having a plurality of entries 322, each of which contains an inode identifying a file 400.

Figure 4:
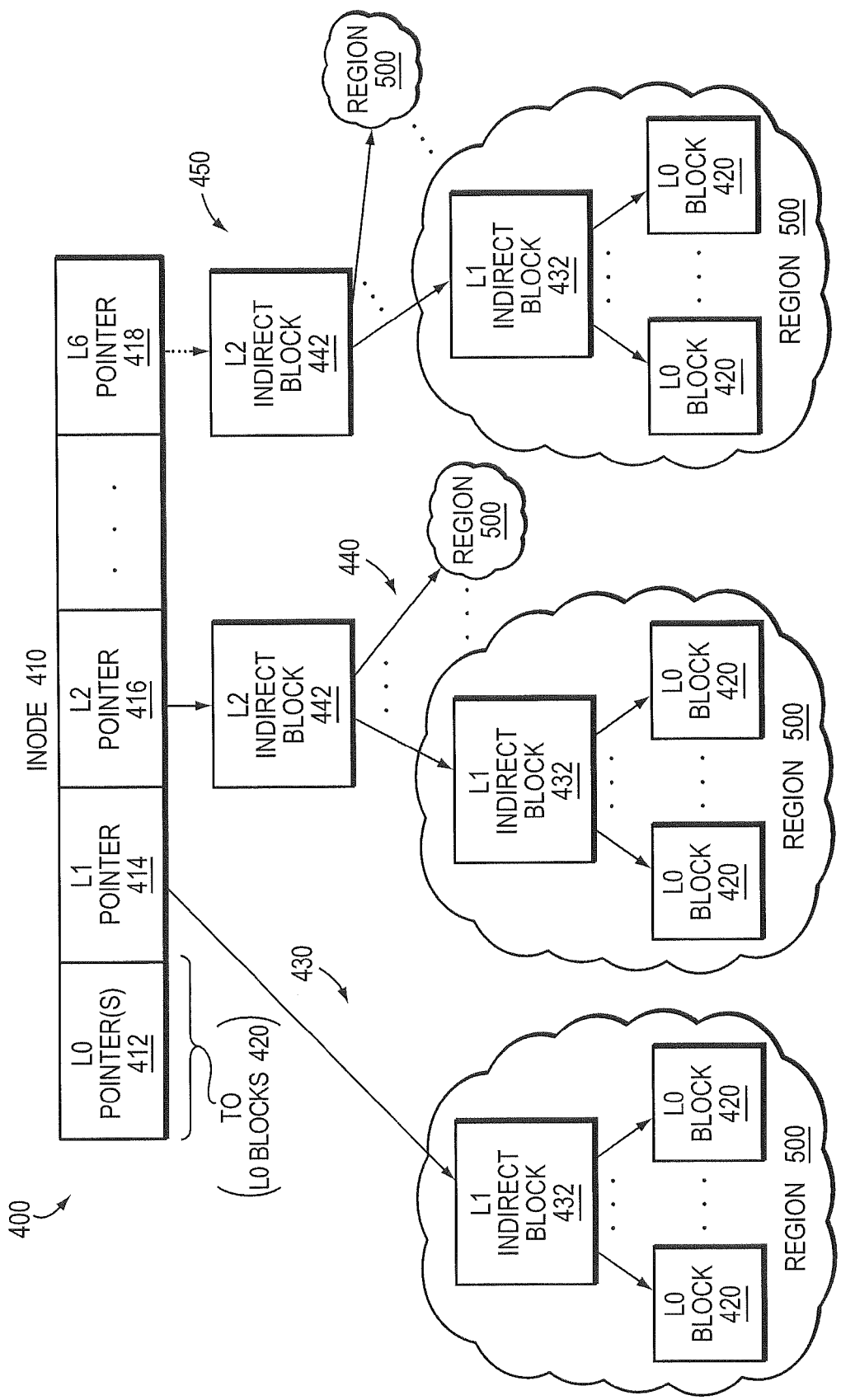
FIG. 4 is a schematic block diagram illustrating an on-disk structure of a file that may be advantageously used in accordance with the present invention.

FIG. 4 is a schematic block diagram illustrating the on-disk structure of a file 400 that may be advantageously used in accordance with the present invention. It should be noted that the on-disk file structure described herein is used in an illustrative embodiment of the invention and that other file on-disk structures are possible, including a balanced indirect block tree structure. Each file in the file system 300 has a hierarchical tree structure of metadata (indirect blocks) that is rooted at an inode 410 from an entry 322 of the inode table 320. The hierarchical tree structure illustratively has a fan-out that accommodates a large file by adding a level of indirection from among a plurality of, e.g., six, different indirect block trees. Illustratively, the inode 410 of the file 400 may contain, among other things, one or more level 0 pointers 412 that reference direct (L0) data blocks 420. In addition, the inode 410 may contain a level 1 pointer 414 that references a level one (L1) indirect block 432 of a first indirect block tree 430 that includes, e.g., a plurality of L0 blocks 420; a level 2 pointer 416 that references a level two (L2) indirect block 442 of a second indirect block tree 440 that may include a plurality of L1 indirect blocks 432 and L0 blocks 420; etc. up to a level 6 pointer 418 that references a level six (L6) indirect block (not shown) of a sixth indirect block tree 450 that eventually may include a plurality of L2 indirect blocks 442, as well as L1 indirect blocks 432 and L0 blocks 420.

The size of the indirect blocks is illustratively selectable (i.e., not limited to a particular size), although each block pointer represents a predetermined (e.g., 64-bit) disk address. Depending upon the size of the file 400, the indirect block trees are filled, starting at the lowest indirect block tree level. For example, the first indirect block tree 430 can illustratively accommodate a file having up to 2000 blocks, the second indirect block tree 440 can accommodate a file having up to 4 million blocks and a third indirect block tree (not shown) can accommodate a file having up to 8 billion blocks. The structures of the indirect blocks (particularly above the L1 indirect block 432) are substantially similar, i.e., they include a list of pointers to other indirect blocks (at other levels). For instance, an L2 indirect block 442 may point to one or more L1 indirect blocks 432 or, in an alternate embodiment, may point to entire region 500 (that includes an L1 indirect block 432).

Figure 5:
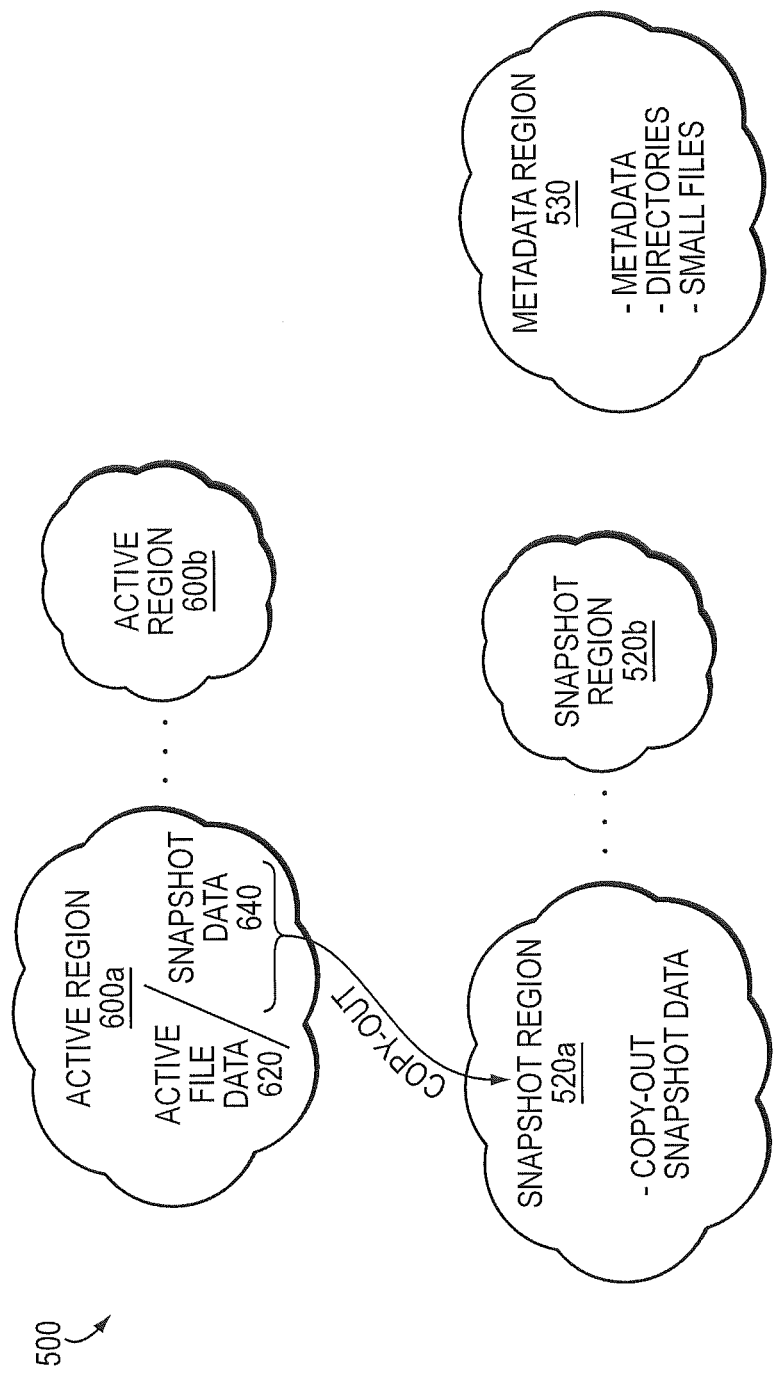
FIG. 5 is a schematic block diagram illustrating regions of disk space that may be advantageously used with the present invention.

FIG. 5 is a schematic block diagram illustrating regions 500 of disk space that may be advantageously used with the present invention. The novel on-disk structure accommodates a plurality of types of regions 500, including (i) active regions 600 that contain active file system data for large files, (ii)

snapshot regions 520 that contain "copy out" snapshot data for the large files and (iii) metadata regions 530 that contain metadata, as well as directories and small files. Each active region contains a fixed range of a file, defined by a range of fbns. Each active region is at least as large as, and is typically somewhat what larger than, the total size of the file fbn range to which it is mapped. Illustratively, the regions are of equal size (e.g., 1 MB) and the size of the disk blocks, such as L0 blocks 420, is chosen to correlate with the size of the file blocks used by the file system. Furthermore, the file block size is variable, e.g., 4 kB, 8 kB, 128 kB, etc., and can be chosen to match the block size used by a client application 112 or desired by an administrator.

In an illustrative embodiment, the file system 300 allocates an active region 600 in response to an event, such as a request to create or extend a large file 400 in which to store data associated with the file. According to the inventive on-disk structure, a first portion 620 of the active region 600 is used to store active file system data for the file 400 (i.e., active data) and a second portion 640 is used to store snapshot data for the file. The first portion of the active region may be the contiguous first portion of the region, or may be assembled from disjoint portions of the region. Illustratively, the first portion 620 of the active region 600 comprises a substantial amount (e.g., 80%) of the disk space of the region, while the second portion 640 comprises the remaining amount (e.g., 20%) of the region 600. For example, if the active region comprises 1 MB of disk space, then the first portion 620 of the region may comprise 800 kB of disk space or, if the file block size is 4 kB, approximately 200 file blocks. Instead of mapping each 800 kB portion of the file to 800 kB of disk space, the file system 300 maps the 800 kB of the file to a larger region of disk space, e.g., a 1 MB region of disk space. The disk space of a region illustratively appears on one disk but that is not a requirement of the on-disk structure; that is, the disk space of a region can be apportioned and striped across multiple disks 130.

Broadly stated, if an L2 indirect block 442 points to an entire region 500, then there are no snapshots and no L1 indirect blocks for the region. However, if an L2 indirect block 442 points to an L1 indirect block 432, then the indirect block 432 stores pointers to all active and snapshot blocks in the region. Illustratively, the L1 indirect block stores a pointer to the first portion 620 of the active region 600 used to store active file data and another pointer to the second portion 640 of the region used to store snapshot data. In addition, the L1 indirect block 432 stores an array of bits, one per fbn contained in the region, indicating whether the corresponding disk block has been written since the most recent snapshot was generated.

Initially, the file system 300 allocates an empty, active region, e.g., active region 600*a*, for the file 400 and stores (writes) active data in allocated disk blocks of the first portion 620 of that region. The file system is illustratively capable of writing any file block to any available disk block location within the active region 600. That is, the 800 kB of active file data may appear anywhere in the active region, not necessarily at the first 800 kB or last 800 kB of disk space, and not necessarily sorted in order. As the active data in the region 600*a* ages, some of the data may only be stored in snapshots, as active data of the file is overwritten. New active data is written to blocks of the region that are still empty, leaving the old snapshot data in current block locations. Hence, the active data blocks of the file may gradually spread throughout the region and be interspersed with data blocks that still must be stored, but that are only stored in snapshots, i.e., in second portion 640 of the active region.

A snapshot of the file may be generated at any time; the resulting snapshot data is illustratively allocated on a per file basis within a region 600. The second portion 640 of the region may comprise the remaining 200 kB of disk space, e.g., 50 file blocks, which may also appear in any disk block location in the active region 600. However, it should be noted that the file system 300 does not maintain a fixed ratio of snapshot blocks to active blocks in an active region 600. In the illustrative embodiment, the maximum number of snapshot blocks is limited by the size of the region −1, since at least one block in the region must be valid in the active file system. The maximum number of active blocks is limited to the number of different fbns covered by an L1 indirect block 432 associated with the region.

In an illustrative embodiment, each L1 indirect block 432 describes (i.e., represents) a corresponding region 500 of the on-disk structure of the file system; in the case of an active region 600, an L1 indirect block 432 represents the active file data portion 620 of a large file. Each active region 600 also illustratively represents a contiguous space (or range) of fbns from a file perspective. For example, a first L1 indirect block represents the first 800 k bytes of the large file, a second L1 indirect block represents the next 800 k bytes of the file, etc. The L1 indirect block that references an active region also performs fbn-to-disk block number (dbn) mapping for the region. As a result, the L1 indirect block 432 is referred to as a "region indirect block" and is illustratively stored as the initial (root) block of its corresponding region 500. Storage of the region indirect block 432 within a corresponding region 500 is advantageous because most read and write operations require access (load/store) of the indirect block. However, the L1 indirect blocks can also be stored in metadata regions separately from the active regions they describe. Moreover, the L1 indirect blocks of more than one region can be stored in a single metadata region disk block. In addition, storage of the indirect block 432 with the data of the region may reduce disk head movement, thereby improving performance of the storage system.

The file system 300 allocates a second or subsequent active region, e.g., active region 600*b*, for the file 400 in response to writing (for the first time) a block representing a fbn position within the fbn range covered by an L1 indirect block 432 associated with that region. That is, in response to writing data to an fbn range of a file, the file system instantiates the L1 indirect block 432 representing the corresponding active region 600 prior to instantiating the actual region. Subsequently, the file system 300 allocates data blocks to which to write to within that region. Notably, this situation can occur before any previously allocated region, e.g., active region 600*a*, is fully populated.

Assume a block of the large file in the active region 600 has not been modified since a snapshot was generated, and now the file system 300 attempts to update the block with new active file data. However, assume further that the block is used in the previously generated snapshot and, thus, cannot be overwritten (i.e., must be maintained). As a result, the updated version of the block is written to a new disk block location of the same active region 600 allocated to the file 400, which new location is tracked (as part of the active file system) in the corresponding L1 indirect block 432. In an illustrative embodiment, the L1 indirect block 432 also keeps track of "accounting" information for the region, including the fact that the previous version of a block is in the snapshot and, thus, must be maintained.

Figure 6:
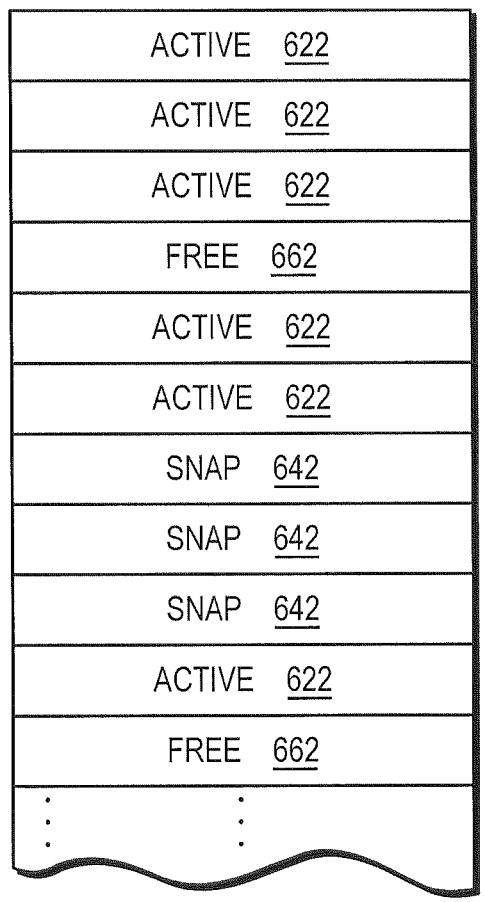
FIG. 6 is a schematic diagram illustrating the organization of an active region in accordance with the present invention.

FIG. 6 is a schematic diagram illustrating the organization of an active region 600 in accordance with the present invention. Illustratively, some blocks within the first portion 620 of the active region 600 are marked as being used in the active file system ("active 622"), some blocks within the second portion 640 of the region are marked as being used in one or more snapshots ("snap 642"), and some blocks are marked as being unallocated ("free 662"). Subsequent to generating a snapshot, if any active blocks 622 are overwritten within the active region, e.g., in accordance with write operations, and if one or more of those blocks is also required by a snapshot (i.e., it has yet to be overwritten since the most recent snapshot was generated), the block is preserved as is in its current vbn position of the region to become a snapshot block of that fbn position of the file. The new version of the block is written to any free block space 662 within the active region 600. If there is no such space, a copy-out operation is performed to create empty space by removing all snap blocks 642 in the region belonging only to snapshots and that no longer belong to the active file system. If a block to be overwritten does not also belong to a snapshot, it can be overwritten in place.

One or more new active regions may be allocated to the file 400 as the file is extended. However, as the amount of snapshot data associated with the file grows, one or more snapshot regions 520 may be allocated to the file to store the snapshot data, which is "copied out" from the active region(s) 600. To that end, the file system 300 invokes a copy-out process 350 that gathers (reads) all blocks of the active region that are marked "snap", including the blocks that are about to be overwritten, and copies out (writes) the data of those blocks to the snapshot region. All blocks that have valid-to snapid values that are less than the next snap_id of the file are eligible for copy-out. For maximum efficiency, the file system copies-out all of these blocks at once, which enables amortization of I/O operations required for the copy-out over the largest number of blocks. It is this amortization that reduces the impact of copy-out on file system performance. As a result, the file may have a plurality of allocated regions, including active regions that contain active data and snapshot regions that contain snapshot data.

Referring again to FIG. 5, the file system 300 may allocate one or more snapshot regions 520 for the file, which region(s) is only used for storing snapshot data (i.e., copy-out out data) that must be maintained for the snapshots. In an illustrative embodiment, a snapshot region 520 is allocated per file although, in an alternate embodiment, the on-disk structure may be extended to share snapshot regions among multiple files. The snapshot region 520 allocated to the file may hold snapshot data from any active region 600 allocated to the file. When the snapshot region fills, an additional snapshot region is allocated.

Illustratively, the copy-out process 350 of the file system 300 gathers up the snapshot data, e.g., 200 kB or 50 blocks, plus any other blocks in first active region 600a of the file that are about to be overwritten and that are in the most recent snapshot, and copies that data as a set to the snapshot region (e.g., a first snapshot region 520a for the file). As a result, there are at least 50 "free" blocks in the first active region 600a that can be used for a next series of snapshots in that region. When those free blocks become populated with new active data, another 50 blocks in the region will contain only snapshot data and can be copied out. These blocks are illustratively written to the first snapshot region 520a, starting at a disk location where the previous set of snapshot data ended. Likewise, when the second active region 600b becomes fully populated (e.g., 800 kB or 200 blocks of active file data and 200 kB or 50 blocks of snapshot data), the snapshot blocks are gathered and copied-out as a set to the first snapshot region 520a of the file. Once the first snapshot region becomes fully populated with copy-out data, a second snapshot region 520b is allocated to the file. Notably, there is some locality present among the sets of snapshot data stored in each snapshot region, since the region is populated with sets of, e.g., 50, snapshot blocks at a time. Accordingly, the copy-out data is not substantially fragmented over one or more disks 130, thereby improving sequential read operation performance for snapshots.

As noted, the L1 indirect block 432 keeps track of accounting information for its region; in the case of an active region 600, the L1 indirect block 432 keeps track of the contents of that region, including active file system data and snapshot data. When a copy-out operation is performed, the file system 300 updates metadata used to keep track of all snapshot data that has been copied out to a snapshot region 520 of a file. Illustratively, the file system 300 maintains a data structure, e.g., a B-tree structure, for each file that organizes the metadata associated with the copied-out snapshot data. Thus, according to the novel on-disk structure of the file system, each file 400 has an active tree structure comprising an inode and indirect blocks that reference data blocks configured to store active file data and snapshot data within an active region 600, as well as a B-tree structure that keeps track of all copied-out snapshot data for the file.

Figure 7:
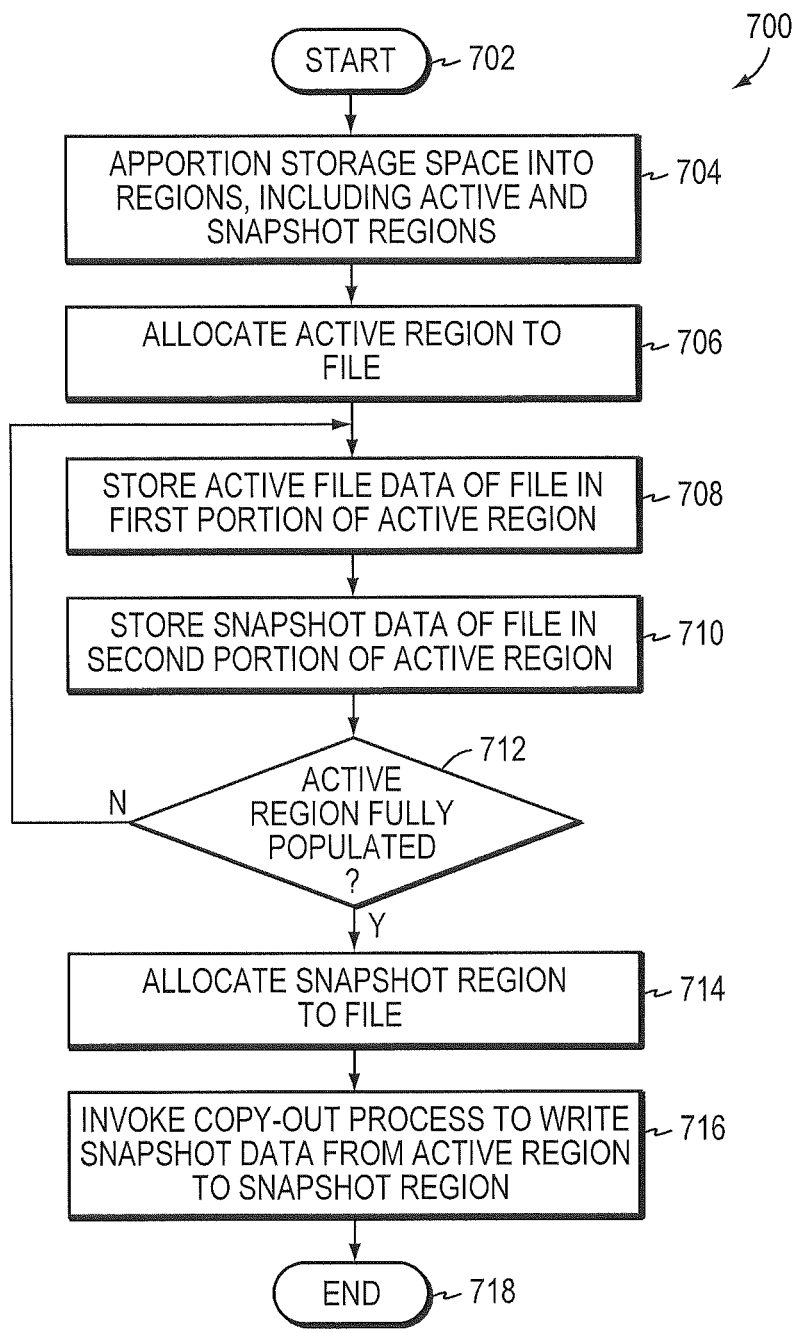
FIG. 7 is a flowchart illustrating a procedure for allocating space to accommodate data of a file in accordance with the novel on-disk structure of a file system.

FIG. 7 is a flowchart illustrating a procedure for allocating space to accommodate data of a file in accordance with a novel on-disk structure of a file system. The procedure 700 starts at Step 702 and proceeds to Step 704 where the file system apportions the storage space of storage devices, such as disks, into a plurality of regions, e.g., active, snapshot and metadata regions. In Step 706, the file system allocates an active region to, e.g., a large file in response to an event, such as a request to create or extend the file to store data. In Step 708, the file system stores active file data for the file in a first portion of the active region and, in Step 710, stores snapshot data for the file in a second portion of the active region. In Step 712, a determination is made as to whether the active region is fully populated. If not, the procedure returns to Step 708; however, if the region is fully populated, the file system allocates a snapshot region for the file in Step 714. In Step 716, the file system invokes a copy-out process to, e.g., write the snapshot data of the active region to the snapshot region. The procedure then ends at Step 718.

While there have been shown and described illustrative embodiments of an on-disk structure of a file system that has the capability to generate snapshots and that provides fast sequential read access to data containers, it is to be understood that various other adaptations and modifications may be made within the spirit and scope of the present invention. For example, a large file may be allocated multiple active and/or snapshot regions, e.g., a 2 MB file may have 800 kB of active file data stored in a first active region, 800 kB of active file data stored in a second active region and 400 kB of active file data stored in a third active region. As a result, 200 kB from each of the first, second and third active regions are illustratively reserved for snapshots, while the remaining 400 kB of the third active region may be reserved for extending the file. However, the remaining 400 kB of the third active region could alternatively be used for snapshot data and if the file is subsequently extended, the snapshot data would be copied-out to a snapshot region.

Also, in accordance with the on-disk file system structure described herein, the file system 300 need only modify an appropriate L0 data block 420 and its corresponding L1 indirect block 432 on disk 130 in response to a request to write (modify) data of a file. If the file 400 is large and has higher-level (L2-L6) indirect blocks, those higher-level indirect blocks (e.g., L2) do not change because they (eventually)

point to the L1 indirect block. Accordingly, a write "in-place" of the L1 indirect block 432 is performed. Notably, the use of a write in-place operation that modifies only one indirect block of a file's indirect block tree represents a relatively small amount of metadata change.

The foregoing description has been directed to specific embodiments of this invention. It will be apparent, however, that other variations and modifications may be made to the described embodiments, with the attainment of some or all of their advantages. For instance, it is expressly contemplated that the components and/or structures described herein can be implemented as software, including a computer-readable medium having program instructions executing on a computer, hardware, firmware, or a combination thereof. Also, electromagnetic signals may be generated to carry computer executable instructions that implement aspects of the present invention over, e.g., a wireless data link or a data network, such as the Internet. Accordingly this description is to be taken only by way of example and not to otherwise limit the scope of the invention. Therefore, it is the object of the appended claims to cover all such variations and modifications as come within the true spirit and scope of the invention.

What is claimed is:

1. A method for providing a structure of a file system stored on a plurality of storage devices executing on a storage system, the file system capable of generating snapshots and providing fast sequential read access to a data container stored on the storage devices, the method comprising:
    arranging sequential portions of the data container into a plurality of regions on the storage devices, each region including a predetermined amount of storage space represented by blocks on the storage devices;
    organizing the plurality of regions as a plurality of active regions, each active region allocated for a different sequential portion of the data container and configured to store active file system data and snapshot data for the different sequential portion of the data container, wherein first blocks in a portion of the active region are marked as one of active for use in an active file system, for use in one or more snapshots, and free; and
    if an active block is marked as for use in the one or more snapshots, preserving the active block within the active region without overwriting the active block with new active data, and writing the new active data to free space within the active region.

2. The method of claim 1 wherein the plurality of regions further comprises one or more metadata regions configured to store metadata.

3. The method of claim 1 further comprising allocating at least one active region in response to an event associated with the data container, wherein the event includes a request to create or extend the data container in which to store the active data associated with the data container.

4. The method of claim 1 wherein if the active block is required by the one or more snapshots, writing the new active data to any block marked as free in the free space within the active region.

5. The method of claim 1 further comprising, in response to a request to create the data container, allocating at least one active region.

6. The method of claim 1 further comprising:
    allocating an additional active region for an additional sequential portion of the data container;
    storing additional active data for the data container in a first portion of the additional active region; and
    storing additional snapshot data in a second portion of the additional active region.

7. A system, comprising:
    a storage system having a processor and coupled to one or more storage devices including storage space, the storage system configured to provide storage services relating to organization of information on the storage devices;
    a storage operating system executed by the processor and configured to generate a snapshot and providing sequential read access to a data container stored on the storage devices, the storage operating system further configured to apportion the storage space into regions, including a plurality of active regions, where each active region is allocated for a different sequential portion of the data container and configured to store active file system data and snapshot data for the different sequential portion of the data container; and
    the storage operating system executed by the processor further configured to preserve an active block within the active region and write new active data to free space within the active region if the active block is marked for use in one or more snapshots.

8. The system of claim 7 wherein the storage operating system executed by the processor further is configured to overwrite the active block with the new data if the active block is required by the one or more snapshots.

9. The system of claim 8 wherein first blocks in a portion of the active region are marked as one of active for use in an active file system, active for use in one or more snapshots, and free.

10. The system of claim 8 wherein the storage devices are disks having disk space.

11. The system of claim 8 wherein the active region comprises a predetermined amount of storage space represented by blocks.

12. The system of claim 8 wherein the data container is one of a file and a logical unit.

13. Apparatus configured to provide a structure of a file system executed by a processor and including one or more storage devices, the file system configured to generate snapshots and provide fast sequential read access to a data container stored on the storage devices, comprising:
    means for arranging sequential portions of the data container into a plurality of regions on the storage devices, each region including a predetermined amount of space represented by blocks on the storage devices;
    means for organizing the plurality of regions as active regions and other regions, each active region allocated for a different sequential portion of the data container and containing active file system data and snapshot data for the different sequential portion of the data container, wherein first blocks in a portion of the active region are marked as one of active for use in an active file system, for use in one or more snapshots, and free; and
    means for preserving an active block within the active region and writing new active data to free space within the active region if the active block is not required by the one or more snapshots.

14. The apparatus of claim 13 further comprising means for transitioning the active block to become a snapshot block of the data container and means for writing the new active data to any block marked as free in the free space within the active region.

* * * * *

UNITED STATES PATENT AND TRADEMARK OFFICE
CERTIFICATE OF CORRECTION

| | | |
|---|---|---|
| PATENT NO. | : 8,909,885 B2 | Page 1 of 1 |
| APPLICATION NO. | : 13/964550 | |
| DATED | : December 9, 2014 | |
| INVENTOR(S) | : Peter F. Corbett et al. | |

It is certified that error appears in the above-identified patent and that said Letters Patent is hereby corrected as shown below:

In the specification:

Column 11, line 40 should read:
is only used for storing snapshot data (i.e., copy-out data)

In the claims:

Claim 8, column 14, line 25 should read:
system executed by the processor is further configured to Signed and Sealed this
Twenty-fourth Day of March, 2015

Michelle K. Lee
*Director of the United States Patent and Trademark Office*